United States Patent [19]

Fisher

[11] Patent Number: 4,955,250
[45] Date of Patent: Sep. 11, 1990

[54] MULTIPLE FOREARM ROBOTIC ELBOW CONFIGURATION

[75] Inventor: John J. Fisher, Wilmington, Del.

[73] Assignee: The United States of America as represented by the United States Department of Energy, Washington, D.C.

[21] Appl. No.: 363,031

[22] Filed: Jun. 8, 1989

[51] Int. Cl.$^5$ ............... B25J 17/00; B25J 18/00; B25J 9/12

[52] U.S. Cl. ................... 74/479; 191/12 R; 242/54 R; 248/51; 414/918; 439/11; 901/9; 901/23; 901/24; 901/28; 901/50

[58] Field of Search .............. 74/479; 191/12 R; 242/54 R; 248/51, 52; 414/744.5, 918; 439/11, 13; 901/9, 23, 24, 28, 50

[56] References Cited

U.S. PATENT DOCUMENTS

| | | | |
|---|---|---|---|
| 3,451,224 | 6/1969 | Colechia et al. | 901/15 X |
| 3,849,668 | 11/1974 | Dane | 901/23 X |
| 4,398,110 | 8/1983 | Flinchbaugh | 901/23 X |
| 4,427,170 | 1/1984 | Truninger | 248/51 |
| 4,577,127 | 3/1986 | Ferree et al. | 310/83 |
| 4,702,668 | 10/1987 | Carlisle et al. | 414/744 R |
| 4,712,972 | 12/1987 | Nakashima et al. | 901/50 X |
| 4,712,973 | 12/1987 | Garin et al. | 901/23 X |
| 4,793,203 | 12/1988 | Staggl et al. | 901/50 X |

FOREIGN PATENT DOCUMENTS

| | | | |
|---|---|---|---|
| 217336 | 4/1987 | European Pat. Off. | 901/50 |
| 218139 | 4/1987 | European Pat. Off. | 901/23 |
| 2590337 | 5/1987 | France | 901/28 |
| 53-72752 | 6/1978 | Japan . | |
| WO-7555 | 12/1986 | PCT Int'l Appl. | 901/24 |
| 770780 | 10/1980 | U.S.S.R. . | |
| 2041879 | 9/1980 | United Kingdom . | |

Primary Examiner—Allan D. Herrmann
Attorney, Agent, or Firm—Stephen D. Hamel; William R. Moser; Richard E. Constant

[57] ABSTRACT

A dual forearmed robotic elbow configuration comprises a main arm having a double elbow from which two coplanar forearms depend, two actuators carried in the double elbow for moving the forearms, and separate, independent end effectors, operated by a cable carried from the main arm through the elbow, is attached to the distal end of each forearm. Coiling the cables around the actuators prevents bending or kinking when the forearms are rotated 360 degrees. The end effectors can have similar or different capabilities. Actuator cannisters within the dual elbow are modular for rapid replacement or maintenance. Coarse and fine resolver transducers within the actuators provide accurate position referencing information.

2 Claims, 3 Drawing Sheets

MULTIPLE FOREARM ROBOTIC ELBOW CONFIGURATION

FIELD OF THE INVENTION AND CONTRACT STATEMENT

The present invention relates to robotic arms. More specifically, the present invention relates to elbow configurations for robots having multiple forearms. The United States Government has rights in this invention pursuant to Contract No. DE-AC09-76SR00001 between the U.S. Department of Energy and E. I. DuPont de Nemours & Co.

BACKGROUND OF THE INVENTION

Discussion of Background and Prior Art

Substantial advances have been made in robotics in recent years and the use of multiple manipulator arms integrated into a single robotic device is not new, as shown in U.K. patent No. 2,014,879. Such a robotic device enables a single robotic system consisting of multiple manipulator arms, perhaps each arm having different dexterity and payload requirement, to perform complex tasks.

In robotic devices like the one described in Colechia, et al., U.S. Pat. No. 3,451,224, which discloses a two-armed robot for use in connection with submarines and underwater research, the two manipulator arms are each attached to larger, main positioning arms. This arrangement allows the two manipulator arms to share the actuators and linkages on the main arm. In practice this arrangement would use the main arm joints to deploy the manipulator arms to a position where they could work. The main arm joints, however, would not be suitable for fine positioning or simultaneous coordinated use of the manipulator joints.

Tasks requiring cooperative use of two or more manipulator arms can be accomplished if the arms can be properly coordinated. But in close quarters, and depending on the configuration, there may be insufficient room for one arm to maneuver without interfering with the other. Introducing mechanical stops to prevent collision would seriously limit the range of motion of each arms. Coordinating multiple arms with computer controlled systems that incorporate collision-avoidance algorithms may prohibit interference but is computationally expensive. Another approach to inhibit arm collisions is to place mechanical stops on the arm joints but this may adversely affect the ranges of motion of the arms.

Although there are robotic devices with independent multiple arms, and devices which have cooperating manipulator arms attached to a main positioning arm, the inventor is not aware of any prior art relating to robots which have multiple forearms depending from a common elbow configuration.

The term "forearm" implies a subset of a more complex robotic arm and in particular, the series of joints and linkages comprising the elbow joint and the end effector, which for simplification refers to both the "wrist" and "hand" of the robotic arm. For example, a "forearm" would not be suitable for use as a stand-alone manipulator but is intended for use in conjunction with a main arm linkage and shoulder joint(s). The elbow refers to the first joint past the end effector.

SUMMARY OF THE INVENTION

An object of the invention is to provide a robotic elbow configuration for multiple forearms.

Another object of the present invention is to provide a robotic elbow configuration for supporting multiple end effectors capable of separate, different, and cooperating tasks including strength-requiring and articulate tasks.

Still another object of the present invention is a compact, modular robotic elbow configuration wherein the forearms and actuators may be replaced easily and quickly.

To achieve the foregoing and other objects and in accordance with the purpose of the invention, as embodied and broadly described herein, the invention comprises a robotic elbow configuration having a main arm, a double elbow on the end of the main arm, and two forearms attached to the double elbow, each forearm having a separate end effector and driven by a separate actuator. A robotic forearm is the portion of the robotic arm between the end effector and the elbow which is the first joint above the end effector. The forearms are coplanar, each rotating 360 degrees about a vertical axis through a double elbow in a so-called SCARA configuration, and each forearm is positioned and moved by a modular actuating canister positioned in the double elbow. Two flat, woven cables containing electrical, coaxial and pneumatic lines for energizing the end effectors feed from the main arm through the elbow where they are coiled loosely about their respective actuating canister, thence into the forearms so that as the arms rotate, the coiled cables tighten or loosen but do not twist or develop kinks.

The multiple forearmed robot is especially adapted for close quarters and for situations where two different, separate cooperating arms are required for one task but, because of a lack of room, arms depending from separate shoulders could interfere with each other or not fit within the space available. Because of the modular nature of the forearms and actuating canisters, actuator replacement, arm maintenance and repair are simplified.

The use of multiple forearms allows a single robot arm, utilizing one shoulder joint and main arm linkage, to perform tasks that otherwise would have to be performed by the two separate arms. The multiple forearm robot is less difficult to control than two independent arms, requires fewer degrees-of-freedom, and is less susceptible to arm entanglements.

Reference is now made in detail to the present preferred embodiment of the invention, an example of which is given in the accompanying drawings.

A BRIEF DESCRIPTION OF THE DRAWINGS

The accompanying drawings, which are incorporated in and form a part of the specification, illustrate the invention and, together with the description, serve to explain the principles of the invention. In the drawings.

DETAILED DESCRIPTION OF THE INVENTION

Figure 1:
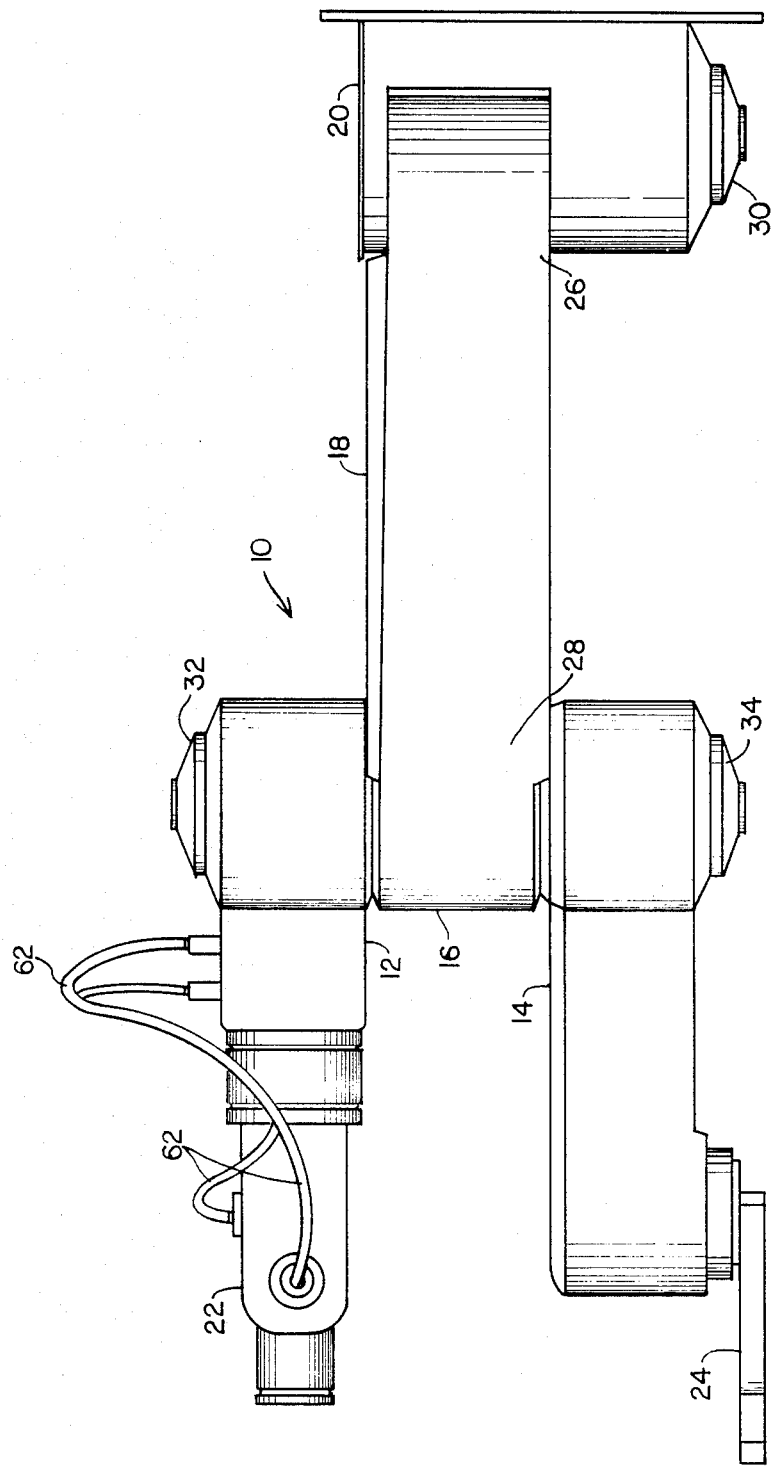
FIG. 1 is a perspective view of a dual forearmed robot according to the present invention.

Referring to FIG. 1, the present invention is an elbow configuration generally indicated at 10 for a robot having two forearms, an upper forearm 12 and a lower forearm 14. Upper forearm 12 and lower forearm 14 are both rotatably attached to a double elbow 16. Double elbow 16 in turn is attached to a main arm 18 which is attached to shoulder 20.

Upper forearm 12 and lower forearm 14 each have end effectors for performing particular tasks. In FIG. 1, upper forearm 12 is illustrated as having an articulating end effector 22. Lower forearm 14 is illustrated as having a heavy lifting end effector 24. The particular type of end effector attached to the forearms is not part of the present invention. However, elbow configuration 10 permits two different, cooperating and non interfering end effectors, examples of which are illustrated, to be attached to the forearms 12 and 14 of elbow configuration 10.

For example, one end effector may be capable of holding a heavy object and the other capable of finely articulated movements perhaps in connection with the heavy object, such as holding and opening the object. Alternatively, both end effectors may be capable of finely articulated movements or heavy lifting movements.

Main arm 18 has a first end 26 and a second end 28. First end 26 of main arm 18 is rotatably attached to shoulder 20. As will be described further hereinbelow, main arm 18 is moved and positioned by a first actuator assembly 30, attached to shoulder 20. First actuator assembly 30 is of the same structure as those actuators which move and position upper forearm 12 and lower forearm 14.

Upper forearm 12 has a second actuator assembly 32 within one end of double elbow 16 allowing upper forearm 12 to move 360 degrees in a horizontal plane about a vertical axis A; lower forearm 14 has a third actuator assembly 34 located within an opposing end of double elbow 16 which also allows lower forearm 14 to move 360 degrees in a second horizontal plane about the same vertical axis A.

Figure 2:
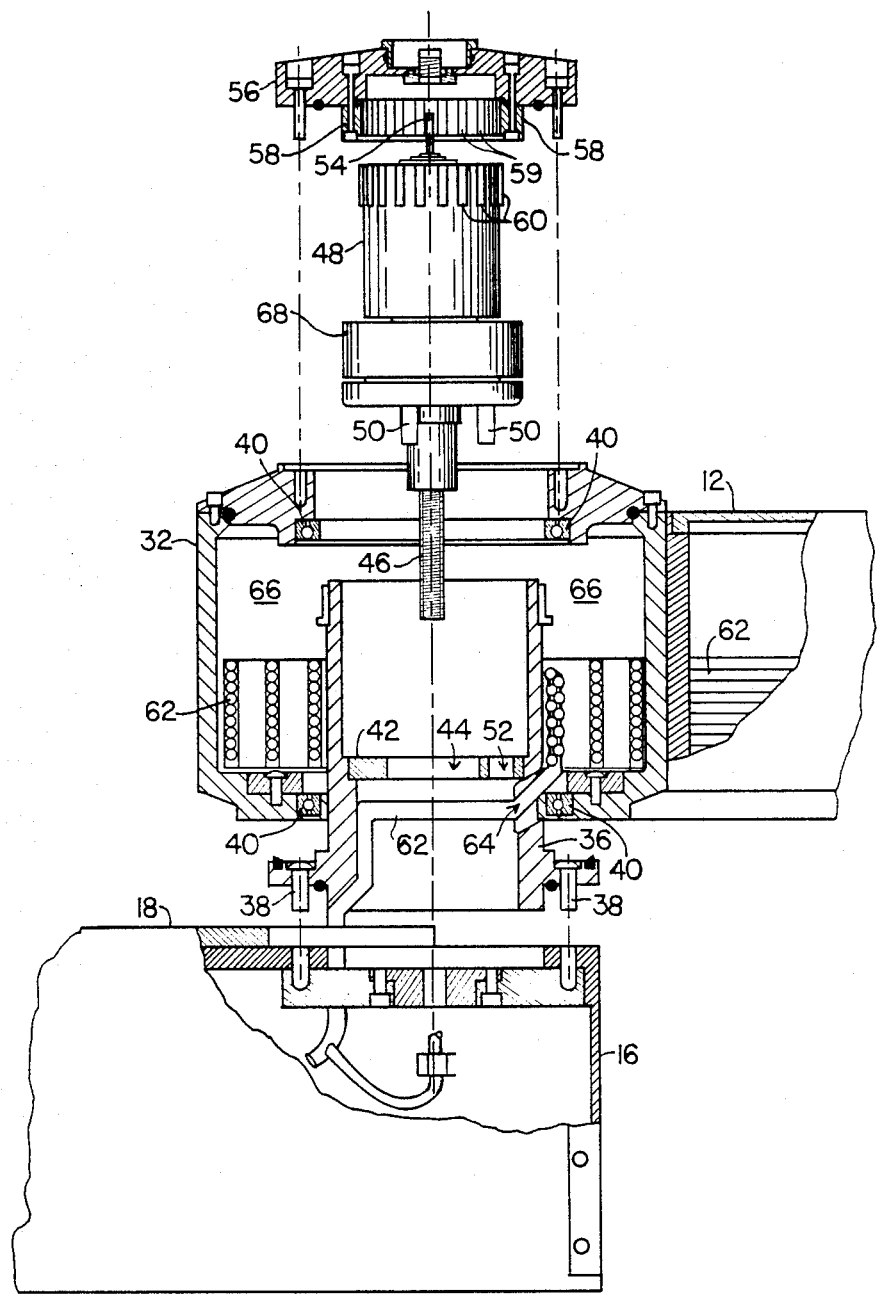
FIG. 2 is a cross-sectional side view of the elbow configuration according to the present invention.

Referring to FIG. 2, which is a cross sectional, partially exploded view of upper forearm 12 and second end 28 of main arm 18 showing in greater detail second actuator assembly 32, it will be seen that upper forearm 12 is carried by a hollow spindle 36 attached to main arm 18 by a plurality of spindle bolts 38. Upper forearm 12 rotates about hollow spindle 36 on low profile bearings 40. Within the hollow spindle 36 is a retainer plate 42 having a central hole 44 for receiving the threaded hold down stem 46 of an actuator cannister 48.

Actuator canister 48 provides torque to rotate upper forearm 12 and positioning information to control the joint. Actuator canister 48 is positioned by inserting its precisely positioned dowel pins 50 in corresponding radial holes 52 in retainer plate 42.

At the top of actuator canister 48 harmonic drive output drives actuator output hub 56 via a harmonic drive output gear 58 having slots 59 which mesh with the splines 60 on the outside of actuator cannister 48. A resolver output shaft 54 secured to the output hub 56 to measure the joint position with respect to the main arm 18.

Providing power to and conveying information to and from actuator 48 and to articulating end effector 22 is a woven cable 62 plugged into a connector (not shown) within main arm 18 for quick disconnection in removal of upper forearm 12. Woven cable 62 passes through main arm 18 into hollow spindle 36 below retainer plate 42 An opening 64 in the side of hollow spindle allows woven cable 62 to enter the annulus 66 between the elbow annular housing 32 and hollow spindle 36 where it is coiled loosely two or more times (as best seen in FIG. 3) before passing out of annulus 66 toward into forearm 12.

Figure 3:
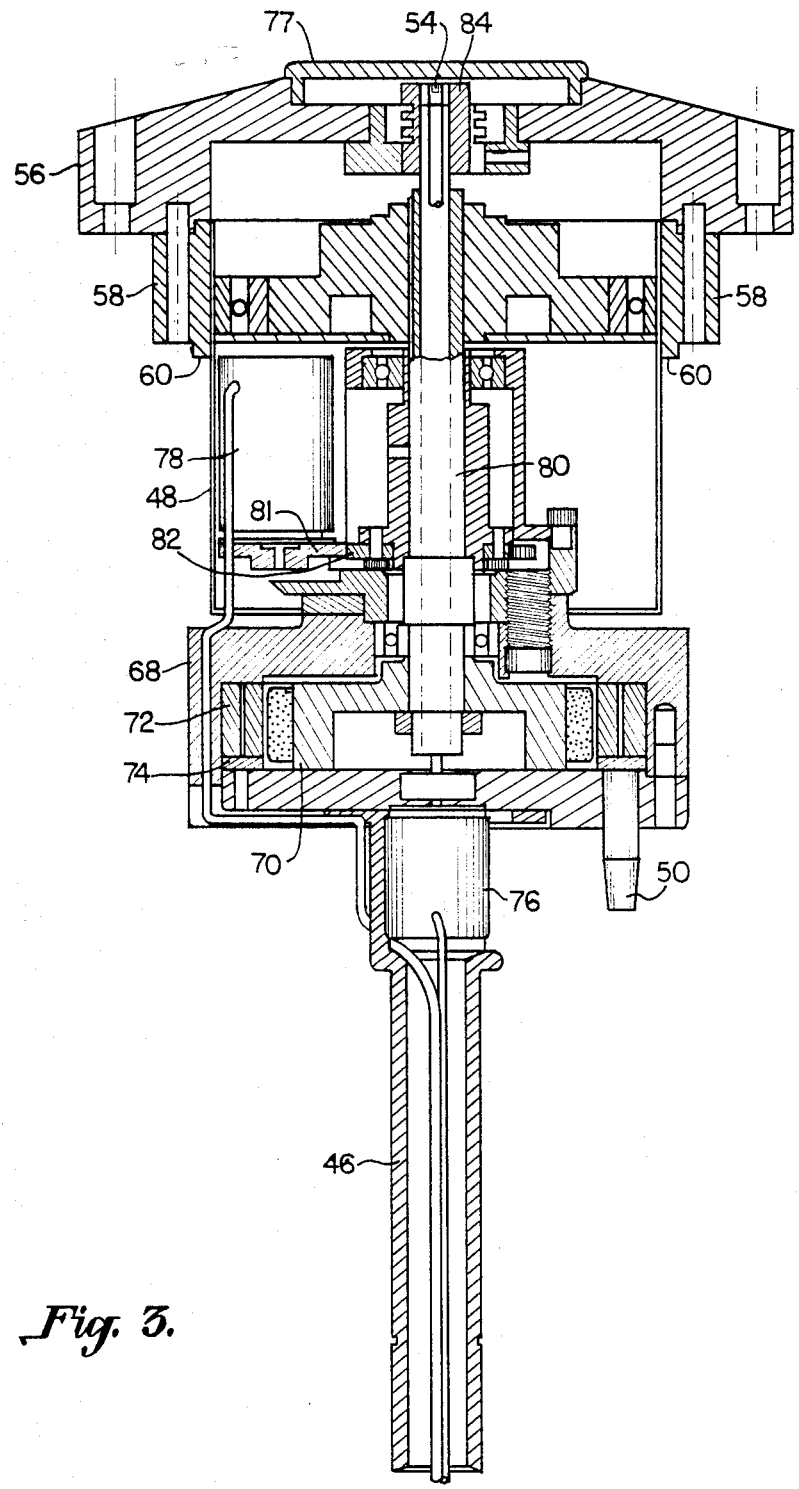
FIG. 3 is a detailed cross sectional side view of the actuator cannister according to the present invention.

In FIG. 3, actuator canister 48 is illustrated in greater detail. A rotor/stator motor and brush assembly 68, having a rotor 70, a stator 72 and brushes 74, provides torque through the harmonic gear reducer to output cap 56. A coarse resolver transducer 76 measures the angle and velocity of upper forearm 12 arm with respect to main arm 18 directly. Coarse resolver transducer 76 is connected to shaft extender 84 which passed through the hollow rotating spindle 80 to the cap 56. The resolver shaft is secured within the flex coupling. A fine resolver transducer 78, coupled to a hollow drive shaft 80 by a drive gear 81 and pinion gear 82, measures the angle and velocity of motor 68. The position and speed information provided by coarse and fine resolver transducers 76 and 78, respectively, are combined algorithmically in a robot controller (not shown) to identify the precise location of upper forearm 12. The use of two resolver transducers eliminates the need for joint limit switches and start-up homing sequences for position determination since the joint positions of the arm can be measured at any time. Adjustments may be made to coarse resolver transducer 76 by removing an end cap 77 of the output hub 56 at the top of the second actuator assembly and turning shaft 54.

The speed of motor 68 is reduced by harmonic output drive gear 58 to which actuator 48 is coupled through splines 60 on the outside of actuator cannister 48 (best seen in FIG. 2).

A portion of the electrical connections of woven cable 62 required to provide power and information to actuator cannister 48 separate from the balance of woven cable 62, pass through a connector (not shown) and are fed into hold down stem 46 and through the body of actuator cannister 48 to rotor/stator and brush assembly 68 and to coarse and fine resolvers 76 and 78, respectively.

The configuration of first and third actuator assemblies 30 and 34 are equivalent to that described above for second actuator assembly 32.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A robotic elbow configuration apparatus comprising:

a main arm having a first side and an opposing side;

an upper forearm rotatably attached for support to said first side of said main arm and adapted to rotate coplanarly with said main arm;

a lower forearm rotatably attached to said opposing side of said main arm and adapted to rotate coplanarly with said main arm and said upper forearm, said lower forearm capable of movement and operating independent of said upper forearm;

a first modular actuator assembly carried by said upper forearm for moving said upper forearm; and a second modular actuator assembly having the same structure as said first modular actuator assembly carried by said lower forearm for moving said lower forearm;

each of said first and second modular actuator assemblies comprising:

an actuator canister within said modular actuator assembly having
 a motor means;
 a shaft means turned by said motor means;
 a gearing means in operative connection with said shaft means;
 a position referencing means in operative connection with said shaft means for determining position;

a spindle within said modular actuator assembly for receiving said actuator canister having a bearing means on which bearing means said actuator assembly rotates; and an output hub means in operative connection with said gearing means for moving a forearm attached to said actuator assembly.

2. The apparatus of claim 1 wherein said position referencing means further comprises a coarse resolver transducer and a fine resolver transducer, said coarse resolver transducer in operative connection with said output hub and producing a first output, said fine resolver transducer in operative connection with said shaft means and producing a second output, so that said first and second outputs can be combined algorithmically to determine the position of said attached forearm.

* * * * *